United States Patent [19]
Cross

[11] Patent Number: 5,977,754
[45] Date of Patent: Nov. 2, 1999

[54] OFFSET RESONANCE ZERO VOLT SWITCHING BOOST CONVERTER

[75] Inventor: David A. Cross, Wrestlingworth, United Kingdom

[73] Assignee: Astec International Limited, The Hong Kong Special Administrative Region of the People's Republic of China

[21] Appl. No.: 09/241,251

[22] Filed: Feb. 1, 1999

[51] Int. Cl.[6] .............................. G05F 1/10; H02M 3/335
[52] U.S. Cl. .............................................. 323/222; 363/20
[58] Field of Search ................................. 363/17, 20, 21, 363/59, 95, 98, 101, 131, 132; 323/222, 259, 344

[56] References Cited

U.S. PATENT DOCUMENTS

| 5,408,403 | 4/1995 | Nerone et al. | 363/37 |
| 5,410,467 | 4/1995 | Smith et al. | 363/131 |
| 5,446,366 | 8/1995 | Bassett et al. | 323/222 |
| 5,637,988 | 6/1997 | Gucyski | 323/222 |
| 5,736,841 | 4/1998 | Gucyski | 323/222 |
| 5,828,559 | 10/1998 | Chen | 363/56 |
| 5,861,734 | 1/1999 | Fasullo et al. | 323/222 |
| 5,880,940 | 3/1999 | Poon | 363/20 |

OTHER PUBLICATIONS

Yang et al. "Analysis and Design of Boost Zero–Voltage–Transition PWM Converter," IEEE 078–03–0982–0/93, pp. 707–713.

Watson et al. "Characterization of an Active Clamp Flyback Topology for Power Factor Correction Applications," Proceedings of the APEC '94 Ninth Annual Applied Power Electronics Conference, Feb. 13–17, 1994, Orlando, Florida, pp. 412–418.

Leu et al. "Comparison of Forward Topologies with Various Reset Schemes," VPEC Sep. 15–17, 1991, pp. 101–109.

Hua et al. "Development of a DC Distributed Power System," Proceedings of the APEC '94 Ninth Annual Applied Power Electronics Conference, Feb. 13–17, 1994, Orlando, Florida, pp. 763–769.

Hua, Leu, Jiang and Lee "Novel Zero–Voltage–Transition PWM Converters," VPEC, Sep. 20–22, 1992 pp. 33–39.

Yoshida et al. "Zero Voltage Switching Approach for Flyback Converter," Fourteenth International Telecommunications Energy Conference, Intelec '92, Oct. 4–8, 1992, pp. 324–329.

*Primary Examiner*—Adolf Deneke Berhane
*Attorney, Agent, or Firm*—Coudert Brothers

[57] ABSTRACT

A boost converter circuit which includes elements capable of generating a zero volt switching (ZVS) signal across the power switch. The ZVS generating elements include a switched shunt inductance which is referenced to the positive rectified supply voltage instead of to the output voltage as with other ZVS techniques. This causes a reduction in the inductance value required for generating the ZVS signal, and a resulting reduction in the power loss associated with operation of the converter. The inventive circuit permits operation of the boost converter using high frequency FET devices or slower switching insulated gate bipolar junction transistors as the power switch.

14 Claims, 9 Drawing Sheets

OFFSET RESONANCE ZERO VOLT SWITCHING BOOST CONVERTER

BACKGROUND OF THE INVENTION

1. Field of the Invention

The present invention relates to switched power supplies, and more specifically, to a circuit for a boost converter which incorporates a switched shunt inductance. The shunt inductance is used to produce a zero volt switching condition across the primary power switch of the power supply. This permits the primary switch to be resonantly switched on with a zero voltage condition in conjunction with a large value for the resonant snubber capacitor. These features reduce the power losses associated with changing the state of the primary switch compared to conventional zero volt switching circuits, and improve the overall efficiency of the converter. The circuit techniques can be applied to continuous and discontinuous boost high power, and high and constant frequency regulators.

2. Description of the Prior Art

Figure 1:
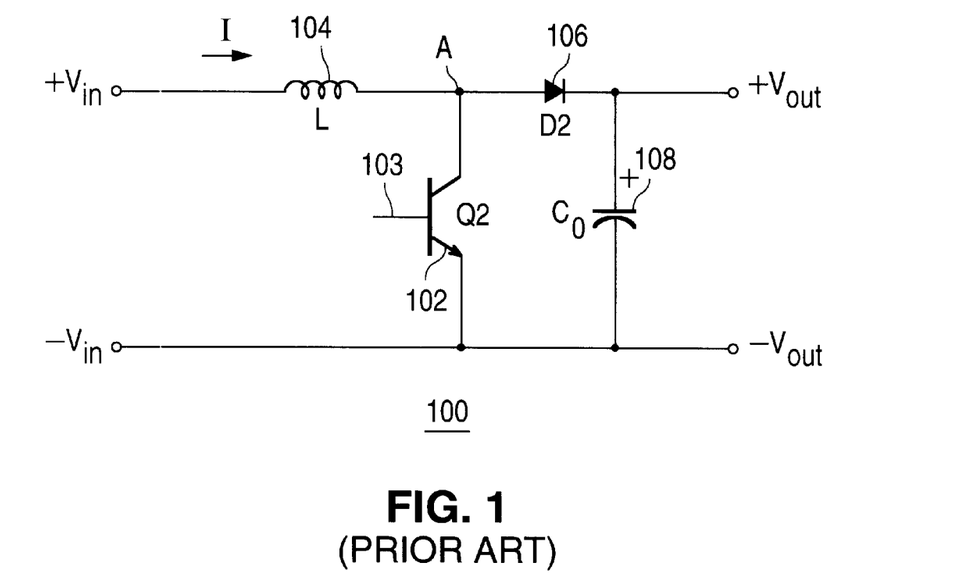
FIG. 1 is a schematic diagram showing a basic circuit for a prior art boost converter.

Switching or "switch mode" power supplies use a semiconductor device as a power switch to control the application of a voltage to a load. A boost or step-up converter is used to produce an output (or load) voltage which is of the same polarity but a higher voltage than the input voltage ($V_{in}$) supplied by the input power supply (not shown). FIG. 1 is a schematic diagram showing a basic circuit for a prior art boost converter 100. The operation of power switch Q2 102 is controlled by applying a waveform to gate node 103. When switch Q2 is turned "on", i.e., conducting, the input voltage $V_{in}$ is applied across primary inductor L 104. Under steady-state conditions, the current (I) in inductor L will increase linearly with time to a peak value as energy from the input supply is stored in its magnetic core, as described by the relationship V=L dI/dt. Rectifier D1 106 will be reversed biased and thus not conducting. In addition, under steady-state conditions, current will flow from output capacitor $C_0$ 108 to the load attached across the output terminals of boost converter 100 as a function of the output voltage ($V_{out}$). This causes the output capacitor to discharge.

When switch Q2 is turned "off", i.e., not conducting, current is no longer supplied by the input supply to inductor L. The inductor attempts to compensate for this change by causing the voltage across the inductor to increase, raising the potential at node A. This keeps the current in L flowing in the same direction as before. When the voltage at node A exceeds the sum of the output voltage across $C_0$ and the diode drop across diode D2, rectifier D2 becomes forward biased and hence conducting. This transfers the current in inductor L to output capacitor $C_0$ and the load. Since the output voltage is greater than the supply voltage, inductor L becomes reverse-biased and the current in it decays linearly downward to its original value. Power switch Q2 is then turned back on to start another cycle. Just before being turned on, the voltage across the power switch is greater than the input voltage, $V_{in}$. As the power switch is turned on, the voltage falls and current through the switch increases, resulting in a loss of power. The output voltage, $V_{out}$, is determined by the duty ratio of power switch Q2 and the supply voltage, $V_{in}$, according to the following formula:

$$V_{out}=V_{in}/(1-D),$$

where D is the duty ratio of the switch and is defined as $t_{on}/(t_{on}+t_{off})$, with $t_{on}$ being the "on" time of the switch during a cycle and $t_{off}$ being the "off" time during a cycle.

A drawback of switch mode power circuits as above described is that the switching devices in such switch mode power converters are subjected to high stresses and potentially high switching power loss as a result of the switch being changed from one state to another while having a significant voltage across it. These effects increase linearly with the switching frequency of the waveform used to control the power switch. Another drawback of switched power circuits is the electromagnetic interference arising from the large dI/dt and dV/dt that occurs when the switch changes state.

The noted disadvantages of switch mode power converters can be reduced if each power switch in the circuit is caused to change its state (from "on" to "off" or vice versa) when the voltage and/or current through it is zero or at a minimum. Such a control scheme is termed "zero-voltage" and/or "zero-current" switching. In the case of switching at a minimum voltage, the control scheme is termed "low-voltage" switching. It is thus desirable to switch the power switching device(s) at instances of zero or minimum voltage in order to reduce stress on the switch(es) and power loss of the power supply or converter. This increases the efficiency of the power supply or converter.

One method of implementing zero voltage switching is to provide a voltage signal across the power switch which passes through a zero value. This can be done by connecting a resonant network (typically an inductor and a capacitor) to the power supply circuit. The network acts to smooth the output signal of the power supply and provide a back emf across the power switch in the form of a sinusoidally varying waveform. The resonant elements are arranged so that the back emf waveform generates a zero crossing voltage signal across the power switch while the switch is off. This provides a zero-voltage or zero-current condition through the power switch which can be used to define the desirable switching point(s) for turning the switch on.

Figure 2:
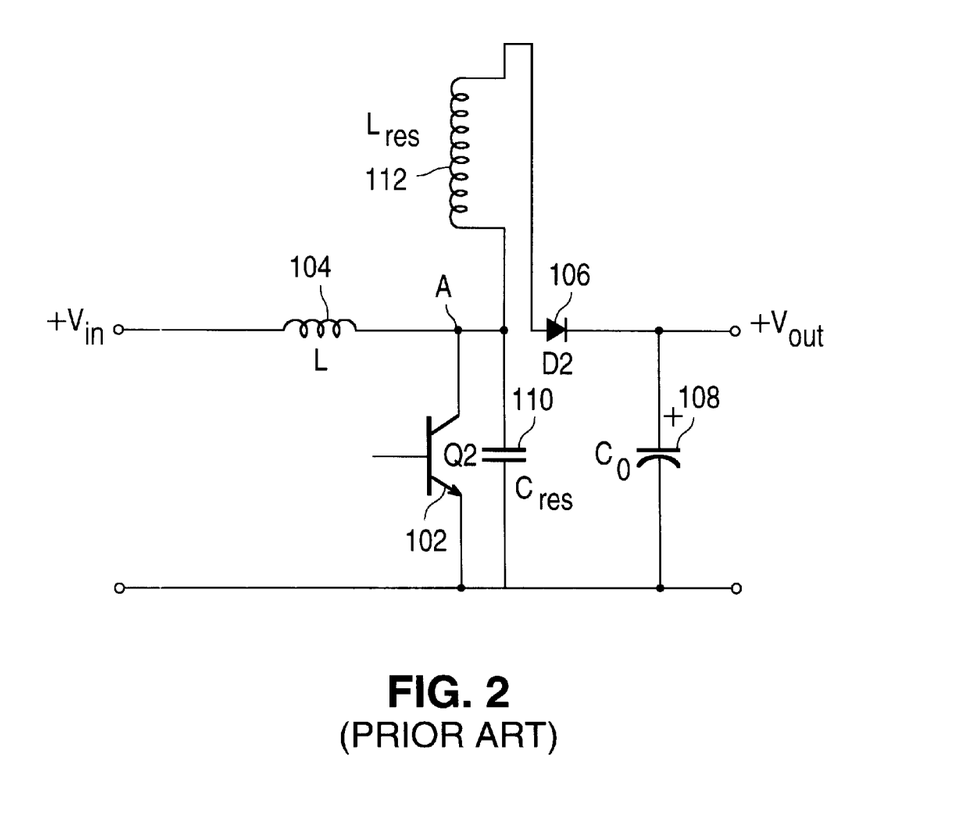
FIG. 2 is a schematic drawing of the prior art boost converter of FIG. 1 to which has been added a LC resonant network known in the art to provide a zero volt switching condition.

FIG. 2 is a schematic drawing of the boost converter of FIG. 1 to which has been added an LC resonant network to provide a zero volt switching condition. As is shown in the figure, a resonant capacitor $C_{res}$ 110 is connected across power switch Q2 and a resonant inductor $L_{res}$ 112 is connected between $C_{res}$ and rectifier D2. When switch Q2 is on, the operation of the circuit of FIG. 2 is the same as that described for the boost converter of FIG. 1. No current flows through $L_{res}$ because rectifier D2 is not conducting.

When switch Q2 is off, current is transferred from primary inductor L to $C_{res}$, charging the capacitor. After $C_{res}$ becomes charged, the potential at node A increases until it exceeds the output voltage across $C_0$. At this point, rectifier D2 becomes forward biased and hence conducting. This transfers current from inductor L to $L_{res}$ and into output capacitor $C_0$ and the load. As the current in L declines, the current being forced into $L_{res}$ also declines. $L_{res}$ responds by pulling charge from capacitor $C_{res}$. $L_{res}$ and $C_{res}$ form a resonant circuit which produces a sinusoidally changing voltage signal across switch Q2, providing a zero crossing signal which can be used to define the desired switching point.

Figure 3:
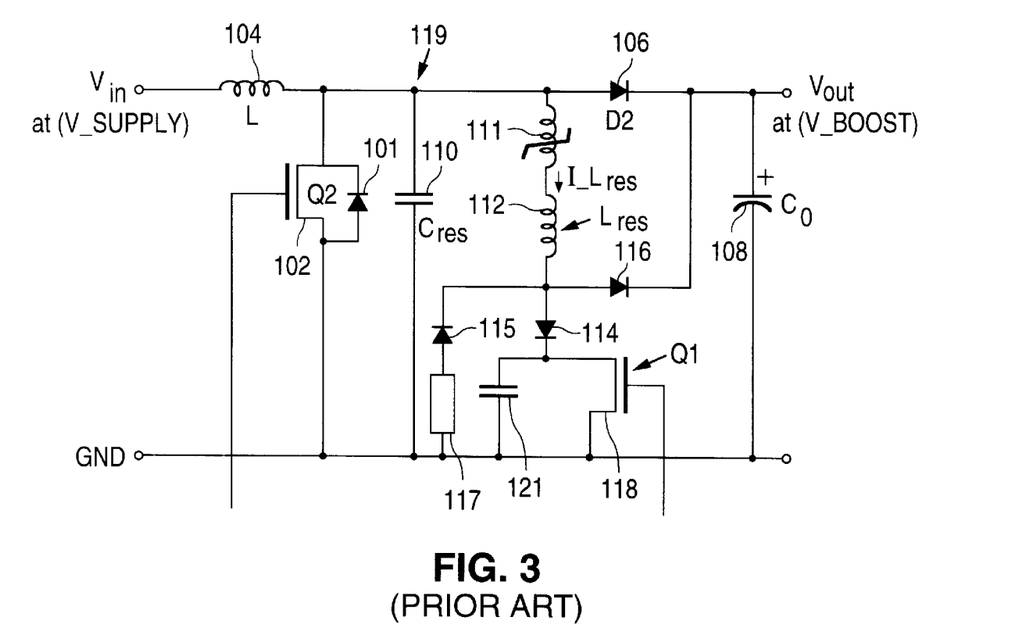
FIG. 3 is a schematic drawing of a prior boost converter having a LC resonant network which is shunted to a ground reference by the action of a switch.

FIG. 3 is a schematic drawing of a boost converter to which has been added an LC resonant network which is shunted to a ground reference by the action of a second switch Q1 118. In FIG. 3, inductor $L_{res}$ 112, is connected to ground via an amorphous core 111, an active switch Q1, and diode 114. There is a shunt path around switch Q1 to ground formed by a resistor 117 and a diode 115.

Amorphous core 111 is typically required, with a ground reference for switch Q1 because after the energy in inductor 112 is put back into output capacitor 108 via diode 116, the current in inductor 112 will turn off and can swing the voltage on the junction between inductor 112 and the cathode of diode 115 to ground, causing diode 115 and resistor 117 to conduct continuously. Resistor 117 allows any residual energy in $L_{res}$ to dissipate quickly.

FIGS. 4(A) to 4(F) are timing diagrams illustrating the operation of the boost converter of FIG. 3. FIG. 4(A) shows the current in inductor $L_{res}$ 112, indicating that the current builds up to the level of that in diode 106 ($I_{D2}$) which has been conducting during the period $t_0$ to $t_1$ after the grounded shunt switch Q1 is turned on at $t_0$, as shown in FIG. 4(E), which illustrates the gate drive signal for Q1. After time $t_1$ the current continues to build up in inductor 112 as the voltage on switch Q2, (shown in FIG. 4(C)) and the voltage at node 119 change in a resonant manner to discharge capacitor $C_{res}$ 110 during the period between $t_1$ and $t_2$.

At time $t_2$, diode 101, which is connected in parallel with switch Q2 102, conducts, as the energy in $L_{res}$ is clamped since there can be no further voltage change on $C_{res}$. The level of this reverse current corresponds to the build up of current above the main load current in inductor 104, which occurs because, during the period $t_1$ to $t_2$, the voltage across $L_{res}$ 112 is positive and therefore stores extra energy during this period. Initially all the current in $L_{res}$ 112 will conduct in body diode 101, but this changes as the current from main inductor L 104 equalizes part of the current. The main drive signal to switch Q2 102 (shown in FIG. 4(F)) will start soon after $t_2$, with a propagation delay of approximately 50 to 70 nanoseconds. The gate drive to switch Q1, (shown in FIG. 4(E)) is terminated at $t_3$. Switch Q1 is required to switch a large current (see V_Turnoff in FIG. 4(B) and I_Turnoff in FIG. 4(A)), which creates both a noisy and lossy situation. The turnoff for shunt switch Q1 cannot be extended because the voltage across inductor $L_{res}$ 112 during the period between $t_2$ and $t_3$ is very small since both Q1 and Q2 are clamped to Ground, causing the reduction in current, –DI/DT (shown in FIG. 4(A)), to be very slow. If the shunt switch Q1 was not turned off but instead kept on, the current would staircase up in $L_{res}$ until saturation occurred.

The amount of excess energy stored in inductor $L_{res}$ 112, is sent to output capacitance $C_O$, 108, via diode 116, as illustrated by the hatched area of FIG. 4(A). FIGS. 4(A) and 4(B) further illustrate the current decrease in $L_{res}$ (4(A)) and the recovery of the voltage on switch Q1 (4(B)), between $t_3$ and $t_4$. As can be seen from FIG. 4(B), the voltage on switch Q1 can reverse, and amorphous core 111 is used to prevent this from occurring.

In Zero Voltage Switching (ZVS) power converters, during each switching cycle the voltage across the power switch is driven to zero by the action of the inductive load, and ideally, the switch is then turned on. This typically requires that ZVS Resonant converters have a large LC tank to ensure that there is sufficient inductive energy to drive the voltage across the switch to zero. However, a disadvantage of this means of providing a zero voltage signal across the power switch is that there is significant power loss associated with the large intrinsic resistance of the resonant network capacitance and inductance, with the power loss being approximately proportional to the values of those elements. This reduces the efficiency of the converter.

What is desired is a boost converter circuit which is capable of zero voltage power switch operation, where the circuit elements responsible for the zero voltage switching produce a lower power loss than presently available devices.

SUMMARY OF THE INVENTION

The present invention is directed to a boost converter circuit which includes elements capable of generating a zero volt switching (ZVS) signal across the power switch. The ZVS generating elements include a switched shunt inductance which is referenced to the positive rectified supply voltage instead of to the output voltage as is common with other ZVS techniques. The inventive arrangement allows for a reduction in the inductance value required for generating the ZVS signal and operation of the boost converter in the ZVS mode with a large value of the resonant snubber capacitance. This combination of features results in a reduction in the power loss associated with operation of the main power switch of the converter. The inventive circuit permits operation of the boost converter using high frequency FET devices or slower switching insulated gate bipolar junction transistors as the power switch, and results in lower power consumption and increased efficiency of the converter.

One embodiment of the inventive boost converter includes a primary magnetic energy storage element connected in series between a positive input voltage supply line and a first node, a power switch connected in parallel between the first node and a negative voltage supply line, and a rectifier connected in series between the first node and an output node. The inventive circuit further includes a switch connected in a series combination with a second magnetic energy storage element at a common node, with the series combination connected in parallel with the primary magnetic energy storage element, and a second rectifier connected between the common node of the series combination and the output node.

DETAILED DESCRIPTION OF THE INVENTION

The present invention is directed to an offset resonance, zero volt switching (ORZ) circuit for a boost converter switched mode power supply. The ORZ circuit includes a switched shunt inductance which is referenced to the input supply level and is used to provide a zero volt switching waveform across the power switch. By referencing the ORZ inductance and switch to the input supply, instead of to the output level, the voltage across the ORZ inductor when it is switched is the difference between the output voltage and the peak input voltage. As will be discussed, this topology provides several benefits over prior art zero voltage switching circuits which are referenced to the output line.

Figure 5:
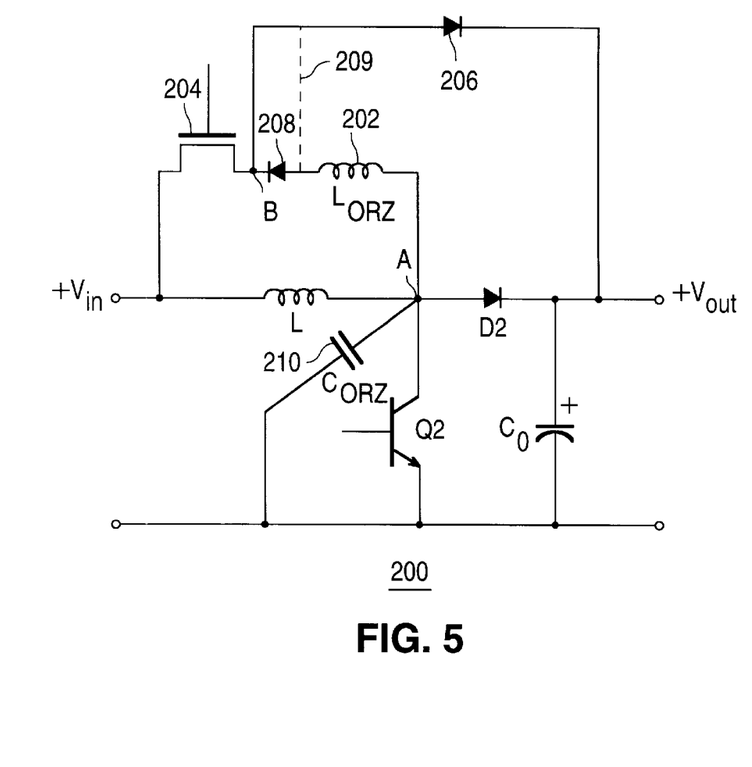
FIG. 5 is a schematic drawing of the offset resonance zero voltage switching boost converter of the present invention.

FIG. 5 is a schematic drawing of an embodiment of the offset resonance zero voltage switching (ORZ) boost converter 200 of the present invention. As shown in the figure, ORZ boost converter 200 includes certain circuit elements in common with the boost converter of FIG. 1. However, in accordance with the present invention, ORZ boost converter 200 includes switched shunt inductance 202 (labeled "$L_{ORZ}$" in the figure) and switch 204. Switch 204 and ORZ inductor 202 are coupled together in a series circuit at a common node (labeled "B" in the figure). The series combination of the two components is coupled in parallel with the primary boost inductor L. Also part of the ORZ circuitry is a capacitor 210 (labeled "$C_{ORZ}$") which is coupled in parallel to power switch Q2. As in FIG. 1, switch Q2 is coupled between node A and the main ground line (or negative supply potential as shown in the figure). Capacitor 210 typically comprises the parasitic capacitance of power switch Q2, boost inductor L, and diode D2. Additionally, capacitor 210 may comprise a discreet component (e.g., a resonant snubber capacitor) coupled in parallel with the parasitic capacitance.

The value of the snubber capacitor may be adjusted to achieve the desired operating characteristics of the ORZ circuitry by modifying the transient generated by primary inductor L (or ORZ inductor 202) when power switch Q2 (or ORZ switch 204) is turned off. As will be discussed in greater detail, a large value of the snubber capacitance assists in producing a significant reduction in the turn off losses of the power switch, thereby improving the efficiency of the inventive converter. This permits the use of high frequency FET devices for the power switch in conjunction with lower power losses. It also permits slower switching devices such as insulated gate bipolar transistors (IGBTs) to be used for the power switch.

During operation, the $L_{ORZ}$ shunt inductance is activated just prior to the turning on of power switch Q2. This is achieved by switching ORZ switch 204 "on" just prior to turning switch Q2 on. This causes ORZ inductor 202 to be coupled in parallel with primary boost inductor L. At this time, ORZ inductor 202 has a high positive voltage cross its terminals due to the fact that the voltage at node A is near the voltage of the output, $V_{out}$ (and, in a boost topology $V_{out} > V_{in}$). The positive voltage causes the current in ORZ inductor 202 to ramp up linearly with time. This behavior is described by the relationship, $V = L_{ORZ}\, dI/dt$, where I is the current in the inductor and V is the voltage across the inductor. The current ramps up until it equals the current flowing through primary boost inductor L, at which point diode D2 becomes reverse biased and current through the diode is cut off. As the voltage across ORZ inductor 202 is still positive at this time, the current in it continues to increase above the amount that is flowing in main boost conductor L. To make up the difference in current between that provided by boost inductor L and that required by inductor 202, charge is drawn from the ORZ capacitor 210, in accordance with the capacitor voltage current relationship (s) $I = C\, dV/dt$ and $Q = CV$. The charge drawn from capacitor 210 by ORZ inductor 202 causes the voltage across capacitor 210 to decrease. With diode D2 shut off and with primary boost inductor L acting substantially like a current source, ORZ inductor 202 and capacitor 210 form a second order resonant circuit which causes the voltage at node A to fall towards zero volts in a sinusoidal manner. When the voltage at node A reaches zero, power switch Q2 may be turned on with zero volts across its conduction terminals (i.e., drain and source for a MOSFET device, collector and emitter for a bipolar transistor), providing zero voltage switching.

With power switch Q2 turned on and the voltage at node A equal to zero volts due to the ZVS signal, a negative voltage is now applied across ORZ inductor 202. The negative voltage causes the current in inductor 202 to decrease in a linear manner. The current in inductor 202, which was used to produce the zero voltage switching signal, is returned back to the input power supply, $V_{in}$ through ORZ switch 204, to be re-used during a subsequent switching cycle. This reduces the power required to operate the converter.

It is desirable that ORZ switch 204 be turned off prior to the voltage at node A becoming greater than $V_{in}$. This prevents $L_{ORZ}$ 202 from becoming forward biased and reducing the energy available for storage in capacitor $C_0$ (or put another way, forward biasing of the ORZ inductor will cause some of the energy supplied by $V_{in}$ to be diverted from the primary inductor, thereby increasing the power consumption of the circuit). One way to accomplish this is to turn off ORZ switch 204 at the time at which the voltage across power switch Q2 goes to zero. Due to the finite response time for a drive signal applied to ORZ switch 204 to cause the switch to open, it may be desirable to have the ORZ switch turn off signal be applied when the voltage across the power switch is some fraction of the way along its descent towards zero, e.g., the voltage value is 90% of the difference between its peak value and zero.

More generally, ORZ switch 204 may be turned off just prior to, during, or after the turn on of the power switch. This permits generation of the zero voltage signal across the power switch, while allowing the relative timing of the ORZ switch and power switches to be varied to optimize the circuit for differing component values and operating conditions (e.g., high frequency). In addition, as will be described, the relative timing of the turn off of the ORZ switch and turn on of the power switch will affect the power consumption and efficiency of the converter.

If switch 204 is turned off before the current in ORZ inductor 202 reaches zero (i.e., before all of the stored energy is returned to the input), then a rectifier 206 is preferably used to divert the current in inductor 202 to the output rather than to the input supply. Rectifier 206 is provided in the path to $V_{out}$ to prevent current from flowing backwards from the output to node A through ORZ inductor 202. In the described situation, the circuit arrangement causes the energy previously stored in inductor 202 to be routed to the output $V_{out}$. This increases the power produced at the output of the converter. This mode of operation is more efficient than routing the energy stored in ORZ inductor 202 to the input, where it would be stored for the subsequent switching cycle. Thus, by varying the delay between the turn off of ORZ switch 204 and the turn on of power switch Q1 (or vice versa), the proportion of energy stored in ORZ inductor 202 which is returned to the input for the next cycle or is routed to the output can be adjusted. This permits trade offs between the power consumption and efficiency of the converter to be made, and the performance of the circuit to be optimized for a desired set of component values and operating conditions.

FIGS. 6(A) to 6(F) are timing diagrams illustrating the operation of the offset resonance zero voltage switching boost converter of FIG. 5. The timing diagrams in FIG. 6 correspond to the situation where the supply voltage to boost voltage difference is comparable to the supply voltage to Ground voltage difference. This condition in a Power Factor Controlled Boost Converter corresponds to a low line high power region of the Mains input cycle, namely inputs from 85 VRMS to 135 VRMS. Such operation results in peak DC voltages into the ORZ switch and Boost Power Conversion of approximately 120 V to 190 V. The Boost DC output voltage may be (for the highest conversion efficiency) around 260 V, but could also be up to 390 V. The voltage between the rectified input voltage and the DC boost voltage (i.e., the overswing voltage) changes continuously during each individual mains cycle, affecting the voltage that the ORZ resonant cycle will allow to swing naturally below the input line, underswing voltage. The overswing voltage and underswing voltage are approximately equal in magnitude, but of opposite phase. The highest power (the peak power level at twice the average power) in a Power Factor corrected supply will occur at the peak voltage, and thus the optimum conditions for the initial ORZ discharge, without turning off the ORZ switch will vary.

As shown in FIG. 6(A), during the period from $t_0$ to $t_1$, the current through $L_{ORZ}$ builds up in a similar manner to that of $L_{res}$ in FIG. 4(A), until the current equals that through diode D2. The value of the ORZ inductor required to obtain the same rate of change of current, DI/DT, as in the case of the circuit of FIG. 3 is proportional to the over-swing voltage, i.e., difference between the boost voltage and the peak voltage supply value at maximum power. This is significantly less than the difference between Ground and the boost voltage, as for the circuit of FIG. 3.

The current in the ORZ inductor ($L_{ORZ}$) shown in FIG. 6(A) will continue to build up between $t_1$ and $t_{1a}$. After time $t_{1a}$, the voltage across the ORZ inductor will change in phase because the voltage drops zero across it, as shown in the graph of VQ2, the voltage across switch Q2 (FIG. 6(C)). At $t_{1a}$ this voltage will become negative and the current in the ORZ inductor (FIG. 6(A)) will begin to fall. Note that this current has dropped considerably before full zero volt switching (ZVS) is achieved at time $t_2$. The residual energy in the ORZ inductor is then significantly lower than that for the circuit of FIG. 3. This is evident by comparing the hatched area in FIG. 6(A) with that of FIG. 4(A) between the same period of $t_2$ to $t_3$ (i.e., after full ZVS has been achieved).

Figure 6:
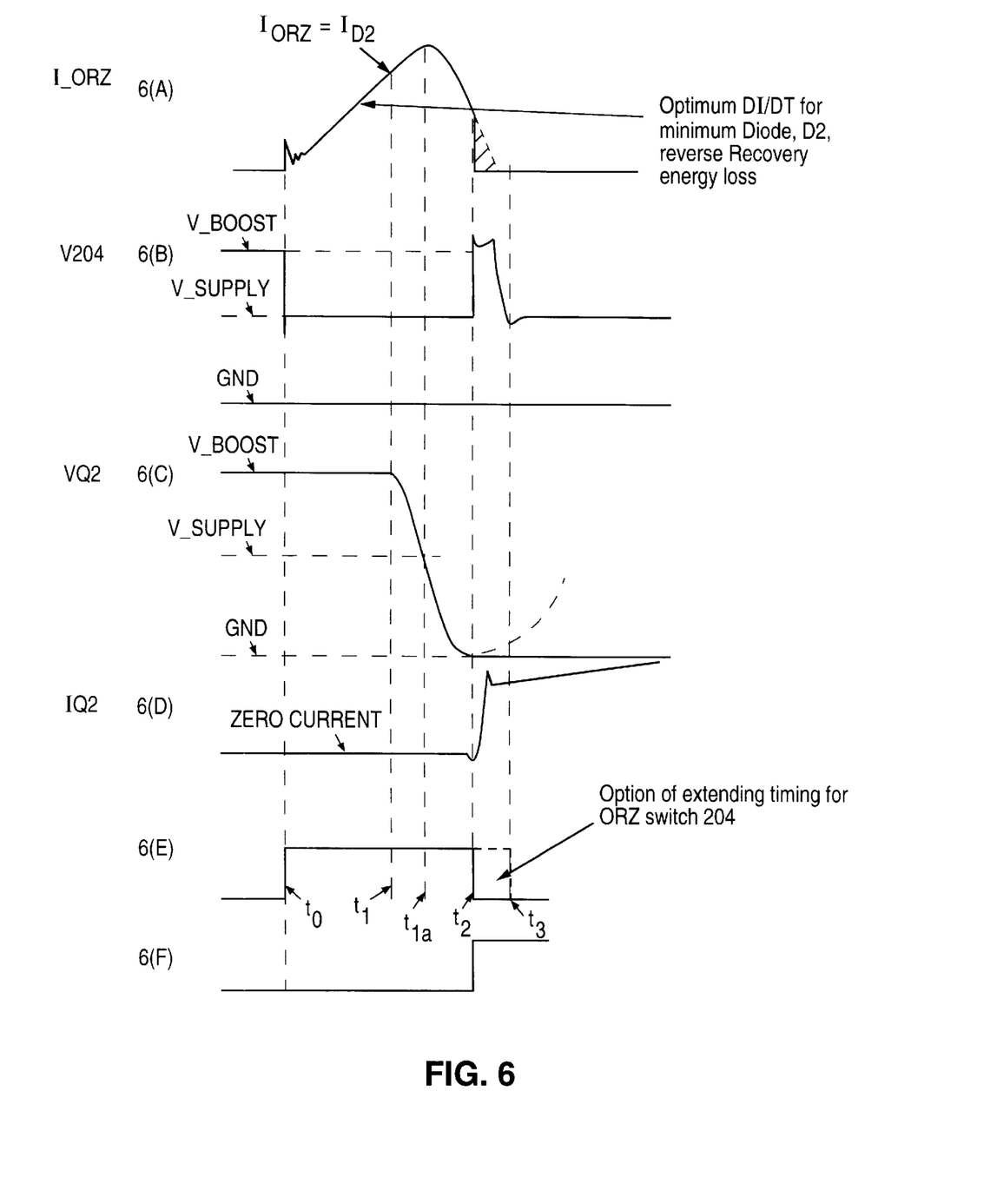
FIGS. 6(A) to 6(F) are timing diagrams illustrating the operation of the offset resonance zero voltage switching boost converter of FIG. 5 for the situation where the supply voltage to boost voltage difference is comparable to the supply voltage to Ground difference.

As indicated by the dotted line for VQ2 in FIG. 6 (C), after time $t_2$, the natural inclination of the resonant circuit state will be to resonate back to the supply voltage level. Thus, a large reverse current capability is not needed for the diode of Q2 for this type of resonant state.

After $t_2$, switch 204 is turned off, with the result of connecting ORZ inductor 202 to output capacitor $C_O$ via diode 206. This transfers any residual energy stored within inductor 202 to the output. This type of resonance circuit utilizes the leakage inductance of the ORZ inductor in addition to its inductance. Although there is a connection to Ground via Q2, which will reduce the current in Q2, this is generally not sufficient to cause a large reverse current to flow in Q2 as such a current would need to be greater than the load current near $t_2$ (see FIG. 6 (D)). The reverse voltage seen across the switch 204 at the instant of turn off is from the difference between the supply and Boost voltages and is significantly lower in current than for the grounded shunt switch case of FIG. 3. This significantly reduces switch off loss, and allows a slower turn off with a significant reduction in the EMI generated.

An amorphous core inductor can be included in series with $L_{ORZ}$, but is not required as in the case of the circuit of FIG. 3, as there is no path for any residual ORZ current to flow once switch 204 is turned off. If an amorphous core is included, it does not suffer from the same stress level as in the case of the FIG. 3 circuit.

An option with the inventive circuit of FIG. 5 that is not possible with the circuit of FIG. 3 is that the timing of the turn off for switch 204 (see FIG. 6(E)) can be extended from $t_2$ up until time $t_3$, while the logic drive signal to the main Boost switch Q2 (see FIG. 6(F)) remains turned on at $t_2$. This has the effect of clamping one end of ORZ inductor 202. This option is possible because the voltage across the ORZ inductor has reversed and has a voltage proportional to the difference between the supply voltage and Ground across it (see FIG. 6(C)), instead of virtually zero as in the case of the circuit of FIG. 3. This means that the current involved can be sent back to the supply with a very low noise zero current turn off of switch 204 and diode 208.

Figure 7:
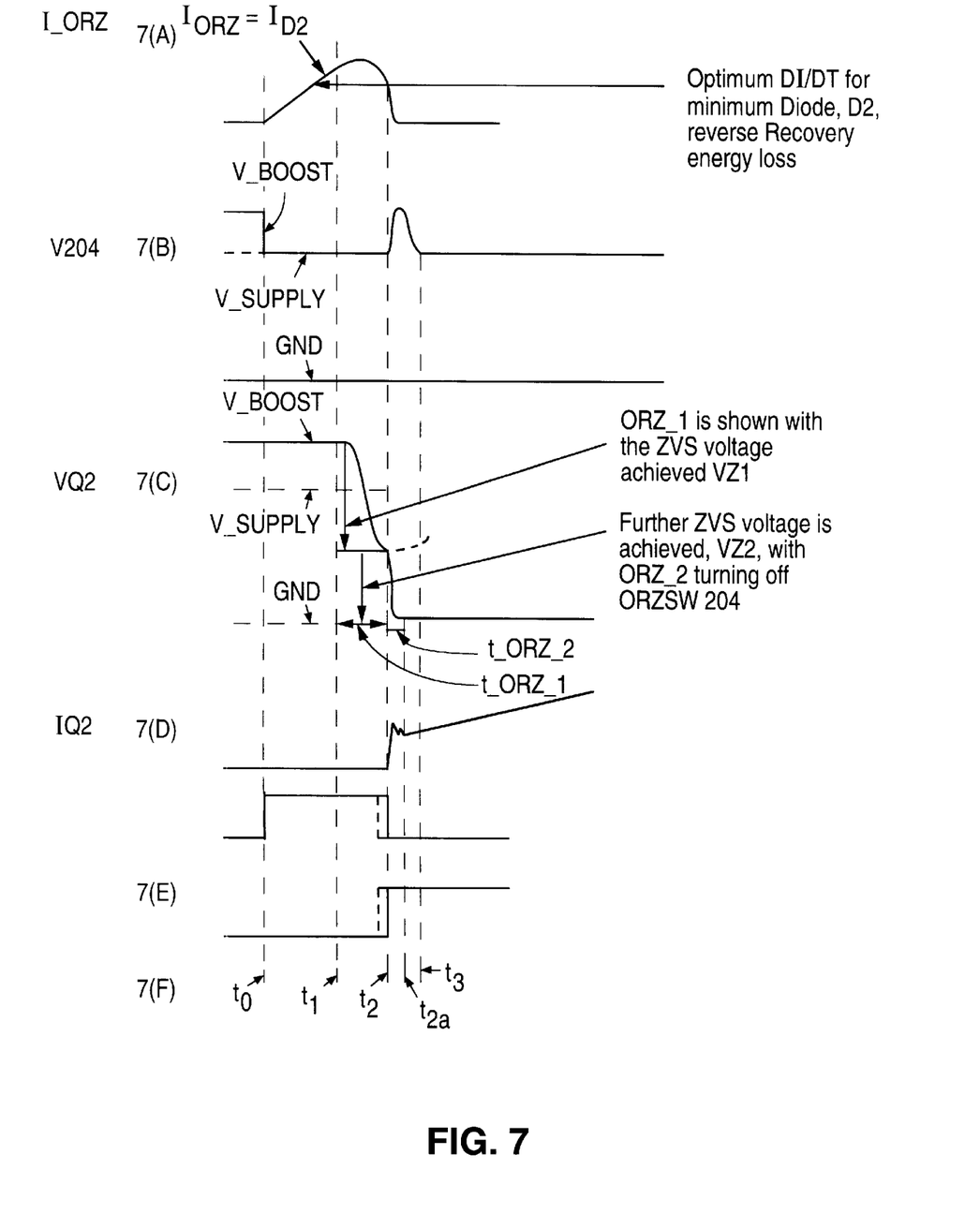
FIGS. 7(A) to 7(F) are timing diagrams illustrating the operation of the offset resonance zero voltage switching boost converter of FIG. 5 for the situation where the supply voltage to boost voltage difference is much less than the supply voltage to Ground difference.

FIGS. 7(A) to 7(F) are timing diagrams illustrating the operation of the offset resonance zero voltage switching boost converter of FIG. 5 and correspond to the situation where the supply voltage to boost voltage difference is much less than the supply voltage to Ground difference. As is illustrated by FIG. 7, full zero volt switching cannot be achieved in this situation by ORZ operation where the resonant circuit rings down with the ORZ switch (element 204 in FIG. 5) closed. This is indicated by FIG. 7(C), which shows the voltage across the primary power switch (element Q2 of FIG. 5). As shown in that figure, the switch voltage decreases and then begins to level off and increase again. To achieve more complete zero volt switching and its related benefits, the energy in the $L_{ORZ}$ inductor can be used to further reduce the voltage across the power switch, as shown by the second reduction in voltage of FIG. 7(C).

The reason for this behavior is as follows. The energy which the resonant circuit provides is the integration over the period of the average voltage difference across the ORZ inductor. This provides enough resonance energy to push the voltage on the ORZ inductor below the supply by at least much as the energy gained. The ORZ resonance operating with a continuous current (i.e., the current through diode D2 greater than zero) will ensure a larger integrated energy. This will push the inductor to a lower voltage, while the primary inductor L continuous current will hold the inductor from dropping further, as illustrated by the voltage at $t_2$. In effect, the ORZ inductor current is attempting to become equal to the primary inductor current which is continuous and cannot supply further energy to capacitor $C_{ORZ}$ 210.

The reason that application of the second ORZ resonance situation causes the voltage to reduce at a higher rate is that the current still flowing in ORZ switch 204 will immediately cause the current to flow out from the ORZ inductor into the ORZ capacitor and does not have to satisfy or supply the continuous load current. In effect, it is disconnected from the primary inductor current by the leakage inductance of the ORZ inductor. As can be seen from FIG. 7(B), after time $t_2$, the voltage at one end of the ORZ inductor rises above the voltage across the ORZ switch, while the voltage at the other end of the ORZ inductor falls, as shown in FIG. 7(C). Prior to time $t_3$ there is no residual energy left in the ORZ inductor (prior to diode 206 conducting) and all the energy has been used to commutate the large value of ORZ capacitance.

This criteria suggests that a control algorithm can be applied to use the energy in the ORZ inductor earlier in the second resonance condition (referred to as an ORZ_2 state in the following) in order to maximize the ZVS state achieved. Normally the ORZ_2 state would be used after a fixed overall period of the first resonance condition (referred to as an ORZ_1 state in the following), if full ZVS operation has not been achieved to terminate the ORZ_1 pulse. However, the control algorithm to be described is based on different criteria which calculates the amount of energy left in the ORZ inductor and the residual voltage on capacitor $C_{ORZ}$ to determine when the ORZ_1 pulse should be terminated. Note that ORZ_2 operation is precluded in prior art circuits which are designed to achieve high secondary current loads, under the condition that no resonance capacitance is used. The control algorithm described above is:

1. DO WHILE ((0.5 1_orz * (I_ORZ) **2..LT.0.5*CORZ * (V_Drain Q2) **2. .AND.
        VQ2 .GE. 0.9 * V_Boost)     .OR.
        T_ORZ .LT. Max Duration)

2. Allow ORZ_1 operation to continue

3. END DO

4. Creat an ORZ_2 turn off by implementing ORZ_2 operation.

Step 1 causes the circuit to cycle around in ORZ_1 operation while the energy in the ORZ inductor is less than the energy necessary to discharge the ORZ capacitance and the voltage on the drain of Q2 is still at the Boost level until diode D2 has recovered; or the time of the ORZ pulse is less than a maximum duration time, possibly around 300 nanoseconds.

Note that implementing the above control scheme requires minimal alteration of the circuit; measuring the voltage on the switch would already be monitored for a ZVS condition and suitable placement of the normal current transformer should allow the normal current measurement to provide the desired control signal(s).

Note that this inventive control principle could be used to reduce the excess energy of the shunt switch circuit of FIG. 3, by switching off the shunt switch before full ZVS has been achieved. This would provide some of the benefits described with reference to the present invention.

Figure 4:
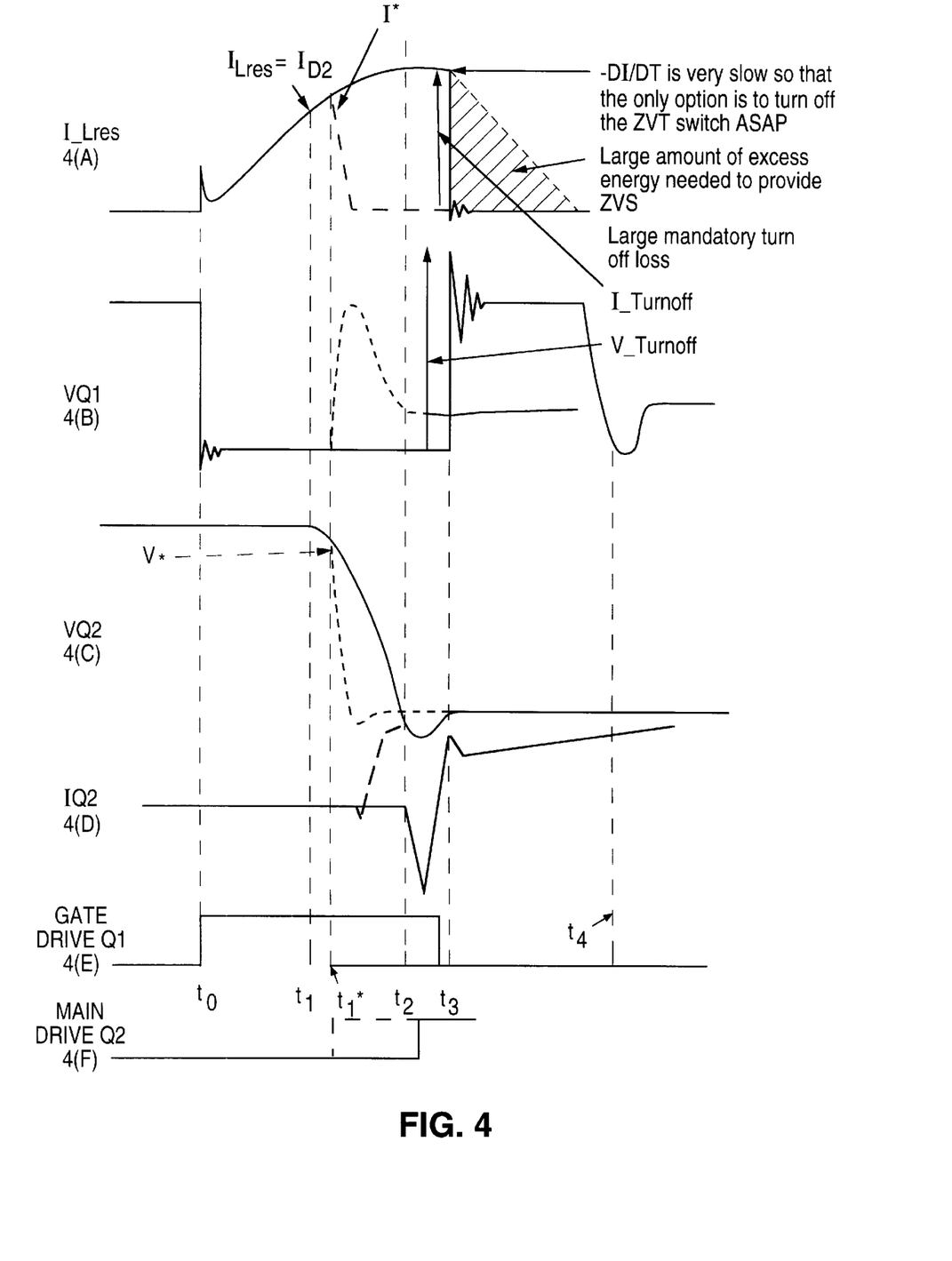
FIGS. 4(A) to 4(F) are timing diagrams illustrating the operation of the boost converter of FIG. 3.

In this regard, if the current through diode D2 (element 106 in FIG. 3), $l_{D2}$, in FIG. 4 (A), has a sufficient magnitude for the energy in the inductor $L_{res}$ to provide full ZVS for capacitor $C_{res}$ 110, then as soon as the voltage seen on Q2 (FIG. 4(C)) has started to fall, both the gate drive pulse to Q1 (FIG. 4(E)) and the main drive pulse to Q2 (FIG. 4(F)) can be terminated between times $t_1$ and $t_2$.

The difference in waveforms achieved with this operating technique is illustrated in FIG. 4 by the changes in the diagrams corresponding to time $t_1$*, i.e., a switching of the gate drives to Q1 and Q2 (FIGS. 4(E) and (F)), and a change in the current (I* in FIG. 4 (A)) and voltage (V* in FIG. 4(C)) after diode D2 has recovered. As can be seen from the figures, this operation provides a large improvement in all loss currents and turn off voltages, while achieving the ZVS benefit(s).

Figure 8:
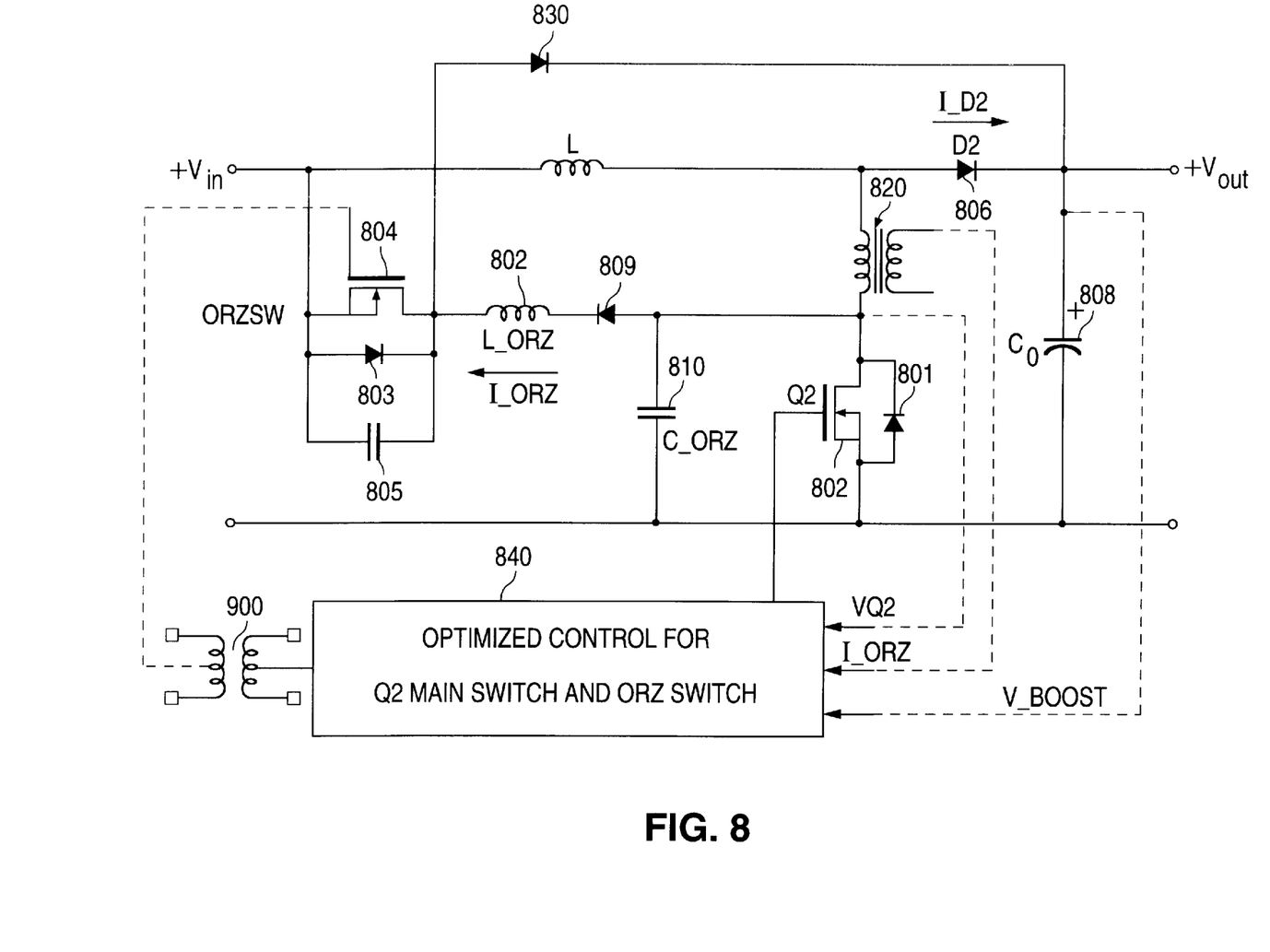
FIG. 8 is a schematic diagram showing another embodiment of the ORZ Boost converter of the present invention capable of higher frequency operation.

FIG. 8 is a schematic diagram showing another embodiment of the ORZ Boost converter of the present invention.

In the circuit of FIG. 8, the position of diode 809 has been moved relative to the position of $L_{ORZ}$ (element 202 of FIG. 5) as compared to the position of diode 208 in FIG. 5. This will cause any negative excursion associated with the ORZ inductor to be clamped by the body diode 803 of the ORZ switch (i.e., element 204 in FIG. 5 and element 804 in FIG. 8). A mandatory charge up path for output capacitance 808 is provided at start up via diode 809 and diode 830.

Disconnection of ORZ inductor 802 from $C_{ORZ}$ capacitor 810 via diode 809 permits a larger period prior to the turn on of switch Q2. This is because $C_{ORZ}$ 810 acts to restore towards the input supply after attaining maximum ZVS, with the time constant of main inductor L, rather than that of $L_{ORZ}$ 802.

Note that the embodiment of FIG. 8 may include a controller (element 840) which acts to implement the previously described switching control algorithm for optimizing the switching timing of the circuit. As shown in the figure, feedback control signals VQ2, $I_{ORZ}$, and V-Boost are used for this purpose. It is noted that any small amount of residual energy could be coupled via a winding to an auxiliary supply.

Figure 9:
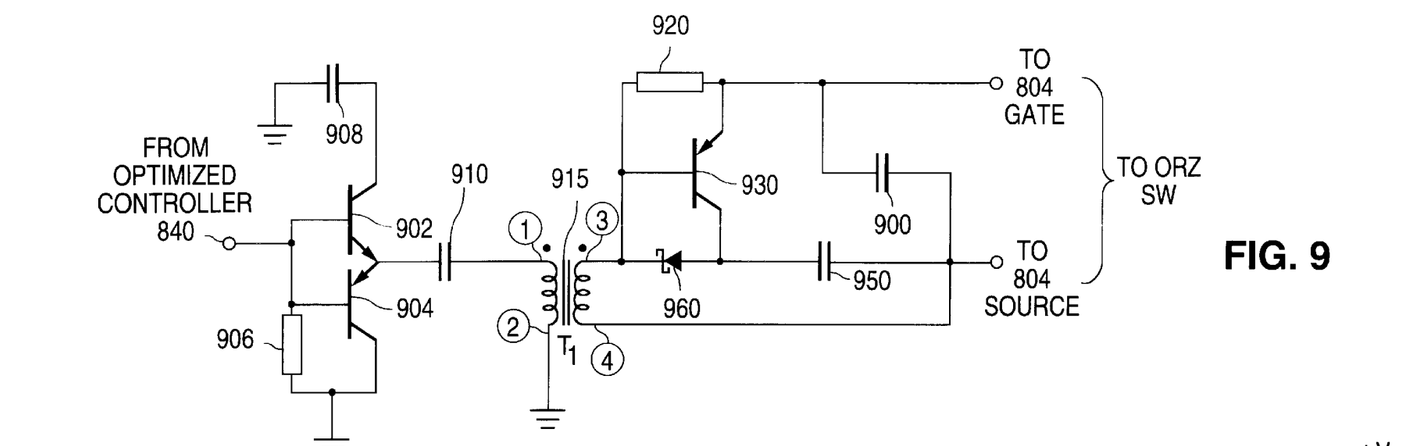
FIG. 9 is a schematic diagram of a driver for use in providing control signals to the ORZ switch in the circuits of FIGS. 5 and 8.

In order to most effectively interface controller 840 of FIG. 8 to an ORZ switch (e.g., element 204 of FIG. 5 or element 804 of FIG. 8), a driver circuit of the type shown in FIG. 9 may be used. The principles of operation of the driver circuit of FIG. 9 will now be described.

Elements 902 and 904 of FIG. 9 are buffer devices which buffer the short duration positive pulse output by controller 840 via a capacitor-coupled circuit (capacitor 910) to pins 1 and 2 of the primary of transformer T1. In one embodiment, transformer T1 is a toroidal transformer having 7 turns wound in a bifilar, low inductance manner. The output from transformer T1 provides a positive signal on pins 3 and 4 which is coupled via resistor 920 and capacitor 940 to the gate of the ORZ switch. The source of ORZ switch is connected to pin 4 of transformer T1.

When the signal from controller 840 changes in phase, signaling a turn off of the ORZ switch, transistor 930 is turned on with it's base connected to pin 3 of transformer T1. In such a situation, a negative voltage (approximately –5 V) is developed on capacitor 950 connected to the collector of transistor 930. The emitter of transistor 930 is connected to the gate of the ORZ switch and provides a low impedance turn off for ORZ switch 804.

The negative voltage on capacitor 950 is charged by schottky diode 960 during the turn off period. The level of the negative voltage is a function of the voltage developed across capacitor 910 during the pulse period. Capacitor 940 contributes to an increase in the noise immunity of the circuit when using a low gate to source input capacitance MOSFET device, but may be eliminated when using devices with high input capacitance between gate and source.

Note that when using the inventive ORZ circuits, the reverse recovery current through the power switch is reduced for the ORZ circuit as compared to the prior art switching circuit. This indicates a lower amount of dissipated power during switching of the power switch when the present invention is utilized. Furthermore, the current through the output rectifier (diode D2 in FIGS. 5 and 8) decreases linearly over time during the time the power switch is off. This is a result of the current from the primary inductor flowing through the rectifier to the output. During the time when the ORZ switch is on and the power switch is off, the current decreases more rapidly to a minimum value (e.g., zero) where it remains during the time period when the power switch is on. This is because the rectifier is reverse biased during this time, so that no current flows through it. The rapid decrease in current flow is a result of energy from the primary inductor being provided to the ORZ inductor. When the power switch is turned off to end the cycle, the current through the rectifier increases quickly to its maximum value as power is delivered through it to the output.

As has been mentioned, the voltage across the ORZ inductor when it is switched into the inventive circuits is the difference between the boost output voltage and the input voltage. This causes the current through the ORZ switch at turn off to be very low, resulting in reduced power dissipation during the operation of the ORZ switch as compared to the operation of the power switch in other zero volt switching circuits. In addition, the peak current in the ORZ switch is lower than that in a power switch for a conventional ZVS circuit because the current buildup in the ORZ inductor after it reaches the level of the primary inductor is controlled by the voltage across the inductor, i.e., the difference between the boost voltage and the input voltage.

For example, in the case of a conventional ZVS switching technique, the capacitive power loss associated with the switching of the power switch is proportional to the square of the boost (output) voltage. However, in the case of the inventive ORZ circuit, the capacitive power loss associated with the switching of the ORZ switch is due to the capacitance of that switch and is proportional to the square of the difference between the boost voltage and the input voltage. Note that for high power circuits and those operating at frequencies above 250 kHZ, this source of power switch loss can be significant for the circuit shown in FIG. 3. The reduced voltage differential across the ORZ switch as compared to that across the power switch in the case of conventional ZVS switching permits higher frequency operation, or use of a lower resistance FET device as the power switch, resulting in a reduced power loss for the boost circuit.

The method of handling the energy stored in the ORZ inductor described herein results in a significant improvement in the overall efficiency of the converter, and is not attained using the resonant switching topology of FIG. 2. As noted, after ORZ switch 204 (or switch 804 of FIG. 8 or 11A) is closed, a current will build up in ORZ inductor, with the magnitude of the current being independent of the component values of the ORZ circuit elements. As further recognized by the present inventor, the voltage swing through the ORZ inductor-capacitor combination, with the common node at a high level and current flowing, is symmetrical over time and independent of the LC component values. Thus, the effect of the ORZ current is to increase the excursion of the voltage across the power switch below the supply rail. If the voltage excursion below the supply exceeds that of the input supply level, then a zero voltage condition across the power switch will occur. The magnitude of the voltage excursion depends upon the converter topology and circuit conditions, and is equal to at least the overswing voltage present when ORZ switch 204 is turned on, with $V_{overswing}$ being the difference between the boost voltage ($V_{out}$) and the supply voltage ($V_{in}$).

Figure 10A:
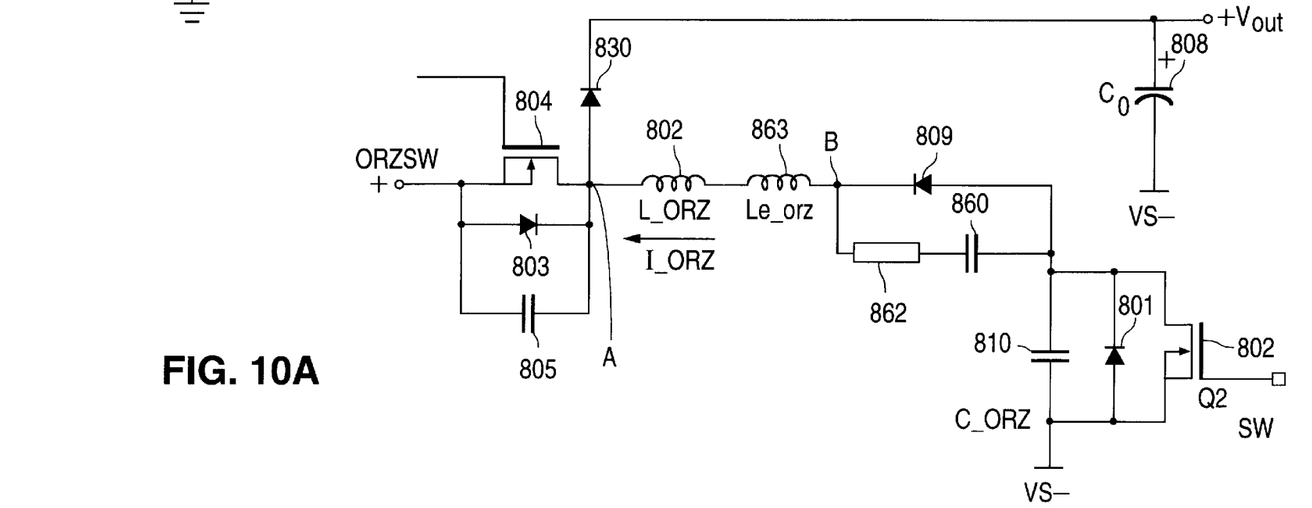
FIGS. 10A and 10B are a schematic diagram (10A) and waveforms (10B) illustrating certain aspects of the operation of the inventive ORZ circuits.
Figure 10B:
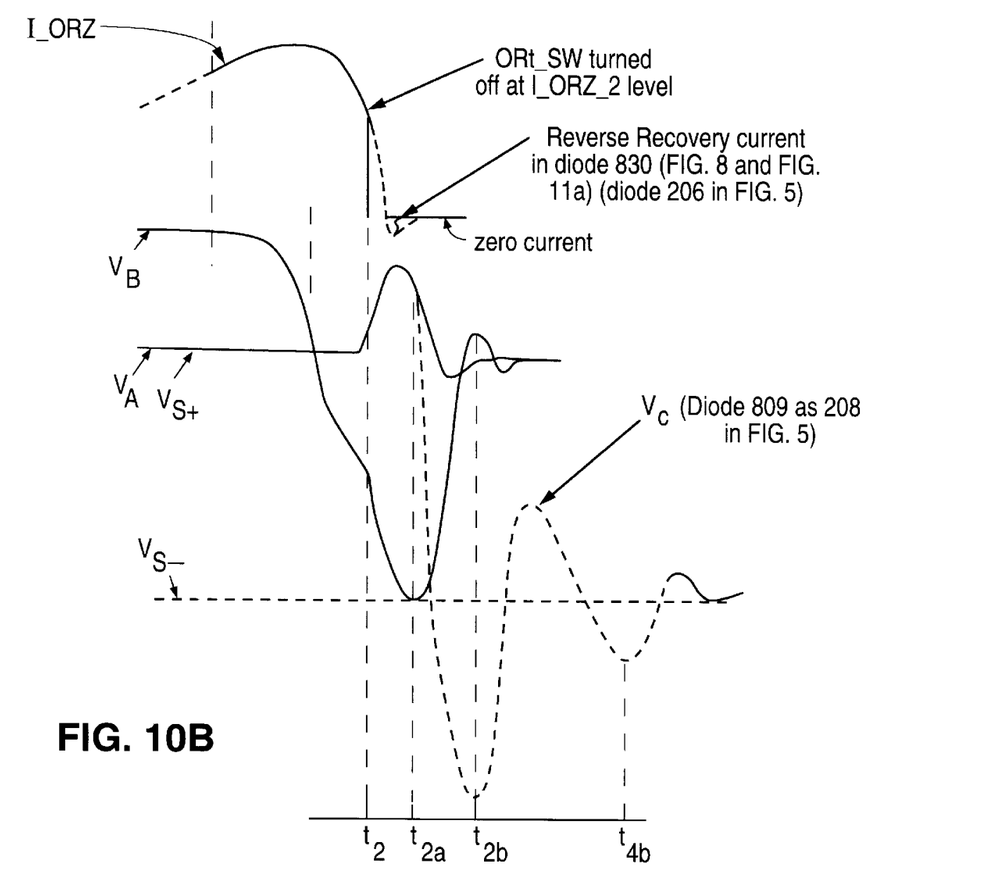

A mechanism associated with an ORZ_2 resonance and having low loss characteristics is illustrated with respect to FIG. 10A, which shows the relevant parts of the circuit, and FIG. 10B which illustrates the circuit waveforms. After time t2, ORZ switch 804 is turned off, producing the ORZ_2 resonance condition. The result is to connect (via diode 830) to the input supply capacitor 808 any residual energy within L_ORZ (i.e., $L_{ORZ}$) inductor 802 and it's leakage inductance Le_ORZ 863. This produces what has been termed an ORZ_2 resonance, using in part the leakage inductance of the ORZ inductor, rather than just its inductance. As is seen in FIG. 10B, the reverse voltage across ORZ switch 804 at the instant of turn off arises from the supply on the drain of the ORZ switch 804 (i.e., at node A in the figure) and negatively discharging the other end of the L_ORZ inductance, via diode 809 and the ORZ capacitance (C_ORZ 810). Thus the slew rate of the voltage which determines the turn off loss in the ORZ switch is a function of the current in the ORZ inductor at. The instant of turn off and the ratio of the capacitance's referred to both ends of the ORZ inductor (as neither end of the ORZ inductance is connected to a solid terminal, Vout or Vs-).

As the current coming out from either end of the ORZ inductor must be equal, the following relationships can be derived:

V_ORZ_SW*C_ORZ_SW=I_ORZ_2* fall time= V1*C_QRZ or

V_ORZ_SW=((C_ORZ/C_ORZ_SW))*V1, where V1 is the voltage change at the Q2 drain node, V_ORZ_SW is the voltage change at the ORZ_SW node, and C_.ORZ_SW is the non-linear drain-source capacitance of the ORZ switch, element 805.

The rate of fall of the waveform will depend upon the value of I_ORZ_2, and will be determined by the leakage inductance Le_ORZ and affected by the relevant capacitance at each end of the inductor:

Rise time at ORZ_SW Drain=(2*P¼.)*SQRT(Le_ORZ*C_ORZ_SW)

Fall time at the Q2 Drain node=(2*P¼.)*SQRT (Le_ORZ*C_ORZ).

Note that the ORZ_2 discharge is different from a nominal turn off where one end of the inductive component is tied to the supply and the rate of change of voltage at the switch is limited solely by the capacitance at the single turn off node associated with the inductor. In the ORZ_2 situation, the turn off is affected by the capacitance at both ends of the ORZ inductor. This means the turn off for the ORZ switch can be very low loss, as the breaking of the current in the switch will result in a relatively slow voltage change that is limited in slew rate and a voltage proportional to the capacitance at both nodes of the inductor. This effect is assisted by the non linear nature of the capacitance associated with the ORZ switch. The initial rise time of the voltage on the ORZ switch will therefore be low. For example a suitable ORZ switch 804 which can be used with extremely low loss for a 2.5 kW peak Power Factor Corrected converter would be an IRF841LC device, which is a 500 V device with a resistance of 0.52 ohms and a low voltage drain-source capacitance of 2 nF. The drain-source capacitance decreases with voltage, such that with 30 V across the ORZ switch the capacitance has fallen to 200 pF.

A drain-source capacitance value for most operational voltage purposes is an equivalent capacitance of 97 pF, and this value in conjunction with the Overswing voltage will determine the frequency dependent loss. The drain-source loss figure for an IRF841LC device operated at 250 KHZ and an average overswing voltage of 150 V is 250 mW. Thus, operation up to 1 Mhz would be possible with this circuit configuration.

As discussed, the turn off of ORZ switch 204 may occur just prior to, at the same time as, or after the turn on of power switch Q2. If turned off after the turn on of power switch Q2, the sooner switch 204 is turned off, the more energy that is stored in ORZ inductor 202 will be transferred to the output ($V_{out}$) rather than directed to the input ($V_{in}$). In this regard, it is important that ORZ switch 204 be turned off before the current in ORZ inductor 202 becomes zero and then goes negative, as this would potentially cause current to flow from the input supply $V_{in}$ to node A through ORZ inductor 202. To ensure that this current path does not occur, a rectifier 208 should be included in the series combination of ORZ switch 204 and ORZ inductor 202 (because of the body diode (element 803) of the ORZ switch, in FIG. 8). With rectifier 208 in the series circuit, the connection of rectifier 206 to the common node (B) between ORZ switch 204 and ORZ inductor 202 may occur on either side of rectifier 208.

Rectifier 208 is also of use in situations in which the gate drive voltage of ORZ switch 204 is not brought all the way down to the voltage level of node A during the "off" period for the ORZ switch. Low voltage operating conditions will most likely ground the gate at node A, whereas, in high voltage operating conditions, the gate will probably not be grounded so that rectifier 208 becomes important as a protection measure to prevent "reverse operation" of switch 204.

Rectifier 206 is best connected directly to the ORZ inductor when large currents are conducted to the output node, as then there will be only a single series diode loss. For situations in which the objective is to pass very little energy through to rectifier 206, so that the majority of the energy stored in the ORZ inductor is used to generate the ZVS signal, the timing of the main power switch relative to the ORZ switch becomes an important issue. In such a situation, it is desirable to re-position rectifier 208 from the location shown in FIG. 5 to that shown in FIG. 8. Note that the body diode of switch 204 will act to clamp the ORZ inductor to the supply level. This is beneficial for operations of the circuit at high frequencies without the use of an amorphous core, and this can be illustrated as follows with reference to FIGS. 10A and 10B.

After the energy has been released from the ORZ inductor (802) and the associated leakage inductance Le_ORZ (element 863, not shown in FIG. 8, but shown in FIG. 10A as being in series with the ORZ inductor ) at time t2a, the voltage at position A (the anode of diode 830) will be at its most positive (approximately the Boost Voltage Vout) and the voltage at node B will be at it most negative (approximately Vs-). This large differential voltage across the ORZ inductor has to be restored to zero. There will be a small amount of reverse recovery current in diode 830 (FIGS. 8 and 11) or in diode 206 of FIG. 5 which will flow into the ORZ inductor. With the circuit configuration of FIG. 8 (and also with that of FIG. 11), the voltage at node A in the circuit will fall towards the supply level and eventually will be clamped by the body diode (803) of the ORZ switch. At node B, the other end of L_ORZ, the voltage will towards the supply level and will have gained a small amount of energy, resulting in a small overshoot in voltage.

An alternative response is illustrated as voltage Vc in FIG. 10B, with diode 809 positioned as diode 208 of FIG. 5 and diode 206 connected to the ORZ inductor, again as in FIG. 5. The response is shown as a dotted line diverting from the response, Va, after t2a, which has a large excursion significantly below the negative supply rail. The maximum voltage seen at time t3b will be that across diode 206 and this peak voltage, unless damped by a series amorphous core or with significant snubber components, can easily reach a level of twice the output voltage. Effectively this is the undamped response of an inductor- capacitor combination (Lopz and the capacitance's at node A) which has had a voltage step (Vout) applied to the circuit. This results in a reverse undamped voltage potential of up to 800 V that could be applied to diode 206 after turn off with a Vout or Boost voltage of 390 V.

Figure 11A:
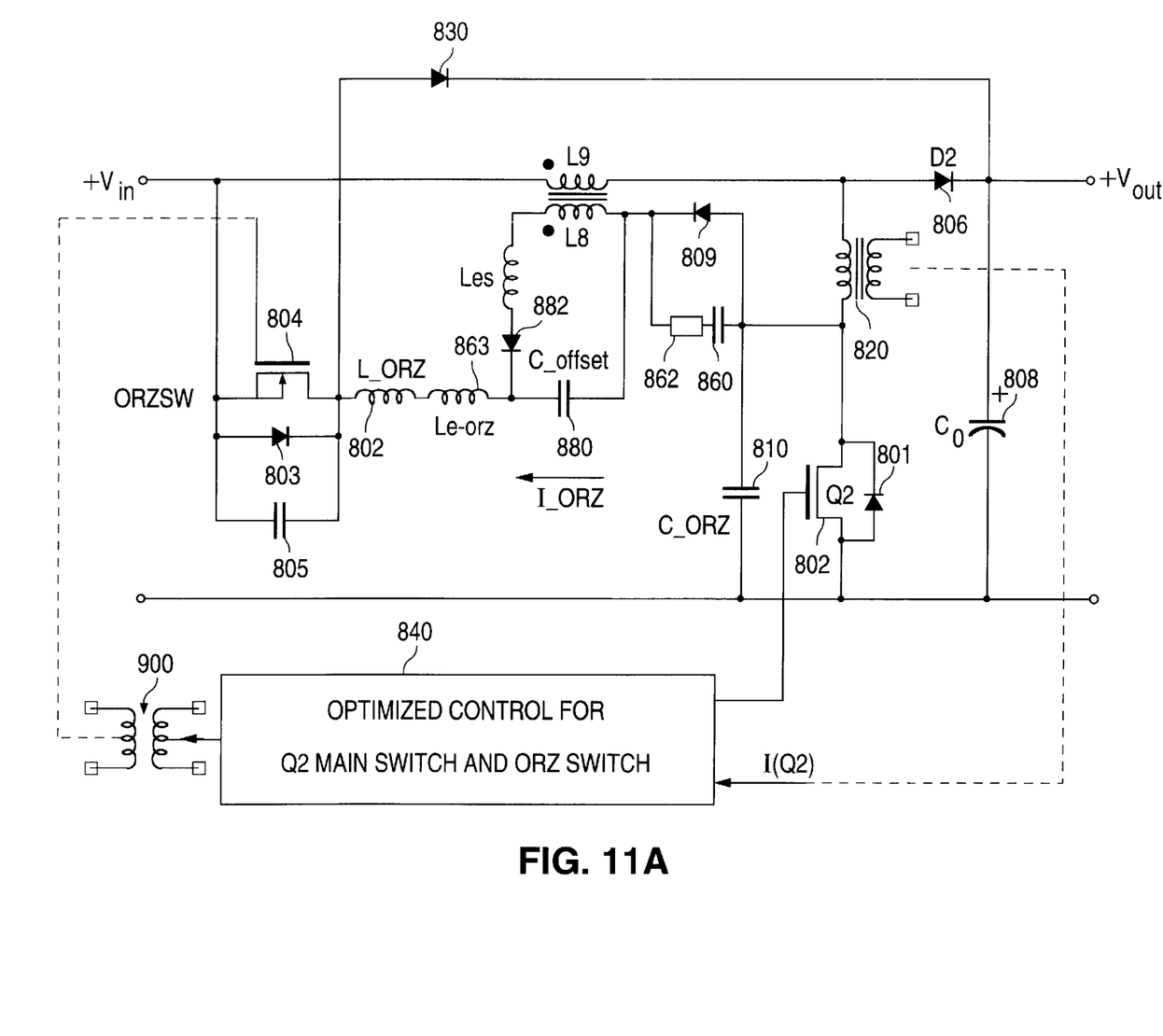
FIGS. 11A and 11B are a schematic diagram (11A) and voltage loci (11B) of an ORZ resonance circuit which includes an offset capacitor in series with the ORZ inductor.

The reason for the significant difference in performance is because in the FIG. 8 or FIG. 11 circuits, the voltages at the ends of the ORZ inductor at time t2a reduce towards each other in a symmetrical manner, gaining only a very small amount of energy. This is because neither end of the ORZ inductor is clamped initially, which significantly reduces current from flowing. There will be some change in current in order to change the voltage on any stray capacitance's associated with either end of the ORZ inductor, but there will be no significant gain of energy until diode 803 conducts, which will probably occur after node B has discharged. This is due to the drain-source output capacitance of the ORZ switch being non-linear so that as the voltage at node A discharges towards Vs+, the capacitance will increase significantly above the reflected capacitance at node B.

The damping components are a resistor 860 of approximately 33 ohm to 100 ohm and an associated dissipation of 250 mW, and a capacitor 862 of 1 nF to 330 pF. These components do not dissipate significant energy because the time constant is extremely short for any residual leakage or inductive energy associated with L_ORZ and Le_ORZ passing through 860 into capacitor 862 when diode 809 turns off. These components 860 and 862 are at the resonating end of the converter and are not discharged actively. They are charged up in voltage at turn off for the main switch Q2 and resonated down in voltage by the ORZ resonance modes (ORZ_1 and or ORZ_2).

However, note that in the circuit shown in FIG. 5, one end of the ORZ inductor is always clamped by the main switch Q2 turn on and so the ORZ inductor gains significant energy in trying to restore it's voltage to zero (which has to be damped, causing a loss which will increase with higher frequency operation). It should be noted that a primary aim of the inventive ORZ circuits is to ensure that only a very small amount of energy is left in the ORZ inductor, so that diode 830 conducts a low current into capacitor 808, and that the highest frequency of operation limits any damping requirements which have to be applied during each cycle of operation.

In operation, ORZ boost converter 200 (and the other inventive circuits described herein) operates in some ways similarly to a boost converter, but with the addition of a shunt inductance ($L_{ORZ}$ 202) which may be selectively connected or disconnected between inductor L and the input supply line by the action of switch 204. ORZ inductance 202 provides an energy storage device which is switchably coupled between $V_{in}$ and $V_{out}$ and used as part of a resonant network to generate a zero volt crossing signal across the power switch. However, instead of that energy being dissipated by the circuit (and therefore reducing the power conversion efficiency of the converter), a portion of the energy stored in the ORZ inductor is returned to the input or to the output. Either way, this provides an improvement in the efficiency of the converter compared to circuits in which the zero voltage switching signal is produced by a resonant network referenced to the output level.

The ORZ circuit of the present invention permits the power switch of the boost converter to be switched on with zero volts across it, in conjunction with a large value of the resonant snubber capacitance. The large snubber capacitance causes a significant reduction in the power losses associated with the switching action of the power switch. This permits high frequency FET switch operation, or the use of slower switching power switches such as insulated gate bipolar junction transistors (IGBT). As the required ORZ inductor value is dependent upon the difference in boost voltage and the input supply line (as opposed to the boost voltage alone), the inductor value required to ensure correct commutation of the boost diode is reduced. In addition, the reduced voltage differential across the ORZ inductor compared to that of the resonant network inductor of FIG. 2 results in a reduction in the rate of increase of the ORZ inductor current after commutation of the boost diode. This current will typically reduce in magnitude as the voltage across the ORZ inductor drops below the peak input supply value. The current will continue to reduce in value as the zero volt signal is produced for the power switch. The current level can be reduced to zero or very nearly zero when switching the power switch. This serves to significantly reduce another frequency dependent loss source of such circuits.

Note that some of the disadvantages of the circuit shown in FIG. 2 are as follows:

1) Lres, inductor 112, is required to pass the full line current as it is in series with the main inductor L and thus its RMS current rating is different from that of the shunt ORZ inductor; and 2) Partial ZVS action can only be supplied for lower power and discontinuous mode operation, and or variable frequency operating boost circuits where the diode 106 current has turned off before the switch 102 is turned on. This severely limits the power conversion density of this type of converter.

Note that although the present invention is intended for use in the context of continuous operating Boost circuits, the ORZ techniques will also work and provide ZVS with discontinuous operating modes of the Boost converter. This is an important feature, because a Boost converter operates through both discontinuous and continuous modes, depending on the level of power and circuit input or output voltage conditions. The operation in the discontinuous mode is similar to the description for continuous cases, and as long as the voltage across the ORZ inductor is positive when the ORZ switch is turned on, ZVS conditions will apply for the main switch.

As noted, the inventive ORZ Boost circuit utilizes the added ORZ elements to obtain significant benefits over Boost converters which lack those elements. The added ORZ capacitance ($C_{ORZ}$) provides the benefits of reducing the turn off loss for the main power switch, permitting the use of slower IGBT devices as the main power switch, and reducing the ZVS timing requirements at turn on for the main power switch.

As the main power switch turn off loss is proportional to the product of (Switch off voltage * current peak)*(fall time of voltage*Frequency of switch signal), and the voltage rise across the switch is proportional to (current peak*fall time)/capacitance, the turn off loss is thus proportional to (current peak)$^2$*(fall time)$^2$*Freq./capacitance.

The capacitance value ($C_{ORZ}$) can thus be up to an order of magnitude greater than the parasitic capacitance, e.g., a value of 2 nF has been used in an embodiment of the invention, whereas the parasitic capacitance was in the range of 300 pF. This relatively high value of $C_{ORZ}$ capacitance would not normally be used in a Boost converter because of its increased RMS power loss.

As also noted, use of the ORZ elements (in particular the ORZ capacitance) permits slower IGBT devices to be used as the main power switch. This is because the higher capacitance value made possible by the ORZ design acts to significantly reduce leakage reactance over-voltage conditions at turn off of the power switch. The ORZ elements also reduce the ZVS timing requirements at turn on for the main power switch by permitting use of a $C_{ORZ}$ value which acts to mask any variations in the dominant parasitic output capacitance of the MOSFET power switch.

Although the present invention has been described in terms of separate, isolated primary and ORZ inductances, it is noted that both inductances may be provided by a common winding or coupled inductances. As noted the power switch can be a MOSFET, IGBT device, or BiMOSFET. The ORZ Boost converter disclosed is capable of high efficiency and high frequency operation (e.g., above 250 kHz and up to 1 MHz, depending upon the type of power switch used and the circuit configuration). The zero voltage switching with minimal switch current achieved by the present invention also results in reduced electromagnetic interference during operation of the converter.

Example values for the components of the inventive circuits include 23 micro-henrys for the main inductor and 3.5 micro-henrys for the ORZ inductor. This provides a power converter suitable for producing 2.5 kilo-watts peak power with an input voltage range from 85 VRMS (volts-rms) to 265 VRMS. In general, when using the inventive ZVS circuits with high values of a snubber capacitance, the main inductor can have a value significantly less than that normally required for ZVS circuits. This enables the use of physically smaller and less expensive parts.

Another embodiment of the circuit as previously described with reference to FIG. 8 is shown in FIG. 11. In FIG. 11A, a capacitor C_offset 880 is connected in series with the ORZ inductor 802. The voltage on this offset capacitor is varied according to the difference in voltage across the main boost inductor when main boost switch Q2 is on, and is proportional to the supply voltage. This voltage is supplied to the offset capacitor by a winding, LS, off the main boost inductor, LP. Diode 882 supplies current to capacitor 880 to replace the charge that was taken out of it by the previous ORZ pulse.

By adding the offset capacitor voltage to the normal overswing voltage, the resulting ORZ switch voltage that is across the ORZ inductor is dependent upon the level of the input supply voltage. When the supply voltage is low no extra voltage is added, whereas when the input voltage is high a proportion of the supply voltage is added. Thus, for high line operation, where the peak of the supply is near to the actual Boost voltage, there is an offset voltage added to the overswing voltage. This results in the natural resonant ring voltage (or underswing voltage) being equal to the supply voltage. Thus, this provides a means of achieving full or near full ZVS for the main switch under differing input line conditions without turning off the ORZ switch.

Figure 11B:
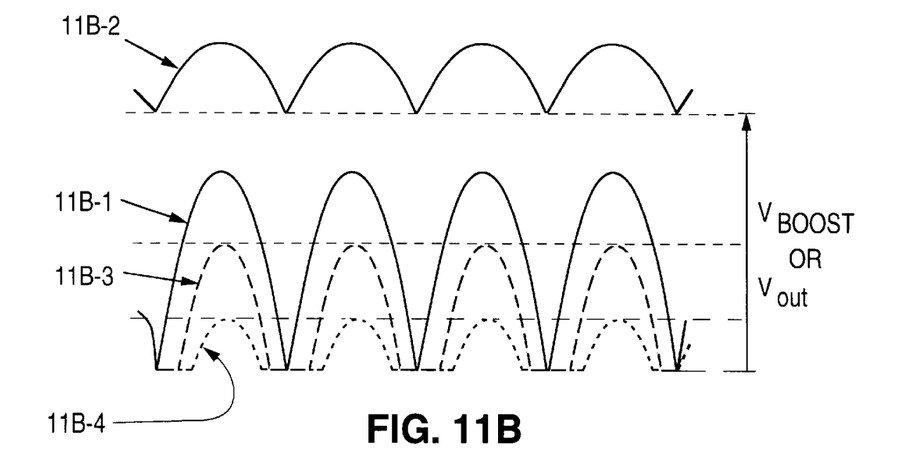

The loci of the natural resonance voltages above and below the supply are shown in FIG. 11B, along with the effect of adding the offset voltage. FIG. 11B-1 is the normal rectified supply; Vin and Vboost or Vout is shown as a DC level. FIG. 11B-3 shows the loci of the ZVS voltage which will be achieved by using ORZ_1 techniques and not turning off the ORZ Switch (i.e., not using an ORZ_2 resonance technique to achieve full ZVS). By adding a voltage proportional to the output (as shown in FIG. 11B-2) to the existing Vout, the loci for full ZVS with ORZ_1 techniques can be changed, see FIG. 11B-4. In fact, because the currents are highest in the center portion of the waveform the addition of the voltage shown in FIG. 11B-2, about 30% of the input voltage, will achieve full ZVS. Note that the value of the offset capacitor may be approximately 220 nF with a turns ratio of 3:1 for the boost to offset capacitor recharge winding.

In particular, this embodiment of the invention would be beneficial when using an IGBT for the ORZ switch, and the ORZ switch was not intended to be used with an ORZ_2 resonance for purposes of switch protection. Another reason for such a mode of operation could be to minimize EMI, so that an ORZ_2 mode was not to used and excess ORZ energy not used for the ZVS requirements was to be recycled back to the supply. A further use of the embodiment would be if for high frequency operation (e.g., at or around 1 MHz) it was determined that an ORZ_2 mode would not be used.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A boost converter, comprising:

a primary magnetic energy storage element connected in series between a positive input voltage supply line and a first node;

a power switch connected between the first node and a negative voltage supply line;

a first rectifying device connected in series between the first node and an output node and oriented to permit current flow in normal operation between the first node and the output node;

a switch connected in a series combination with a second magnetic energy storage element at a common node, the series combination connected in parallel with the primary magnetic energy storage element; and a second rectifying device connected between the common node of the series combination of the switch and second magnetic energy storage element and the output node and oriented to permit current flow in normal operation between the common node and the output node.

2. The boost converter of claim 1, further comprising:

a third rectifying device connected in series with the switch and the second magnetic energy storage element, arranged between the second magnetic energy storage element and the common node, and oriented to permit current flow in normal operation between the second magnetic energy storage element and the common node.

3. The boost converter of claim 1, further comprising:

a third rectifying device connected in series with the switch and the second magnetic energy storage element, arranged between the common node and the switch, and oriented to permit current flow in normal operation between the second magnetic energy storage element and the common node.

4. The boost converter of claim 1, further comprising:

a third rectifying device connected in series with the switch and the second magnetic energy storage element, arranged between the second magnetic storage element and the first node, and oriented to permit current flow in normal operation between the first node and the second magnetic energy storage element.

5. The boost converter of claim 1, further comprising:

a capacitor arranged in series with the series combination of the switch and the second magnetic energy storage element, the capacitor and series combination being arranged in parallel with the primary magnetic energy storage element.

6. The boost converter of claim 1, wherein the primary magnetic energy storage element is an inductor.

7. The boost converter of claim 1, wherein the second magnetic energy storage element is an inductor.

8. The boost converter of claim 1, wherein the power switch is a FET device.

9. The boost converter of claim 1, wherein the power switch is an insulated gate bipolar transistor (IGBT).

10. The boost converter of claim 1, wherein the switch is turned off when the voltage across the power switch is substantially equal to zero volts.

11. The boost converter of claim 1, wherein the switch is turned off when the voltage across the power switch is 90% of a peak value.

12. The boost converter of claim 1, wherein the first rectifying device is a diode.

13. The boost converter of claim 1, wherein the second rectifying device is a diode.

14. The boost converter of claim 1, wherein the third rectifying device is a diode.

* * * * *